June 17, 1969 J. D. WILDE ET AL 3,450,394
WALKING BEAM FURNACE
Filed Jan. 30, 1967 Sheet 8 of 10

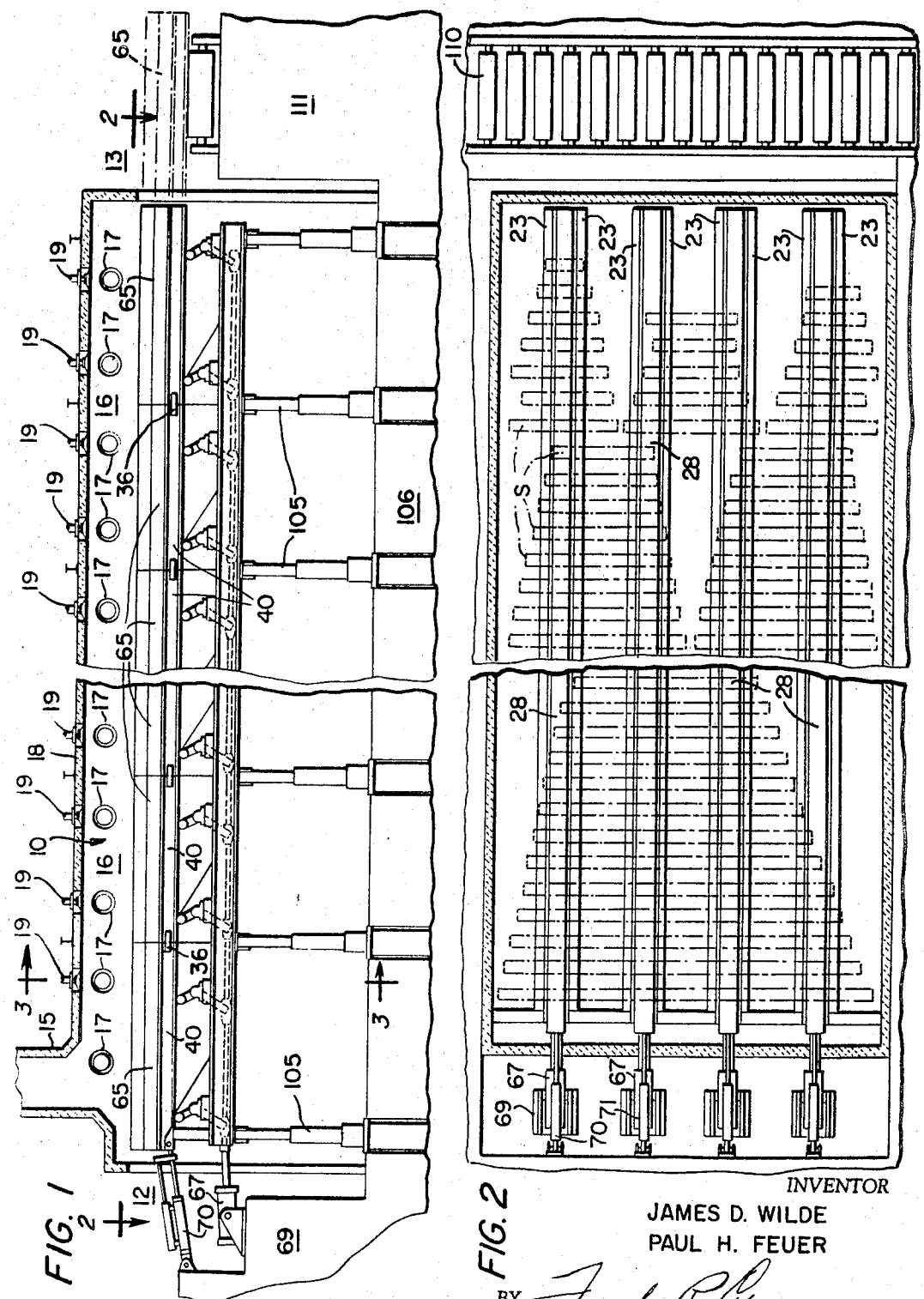

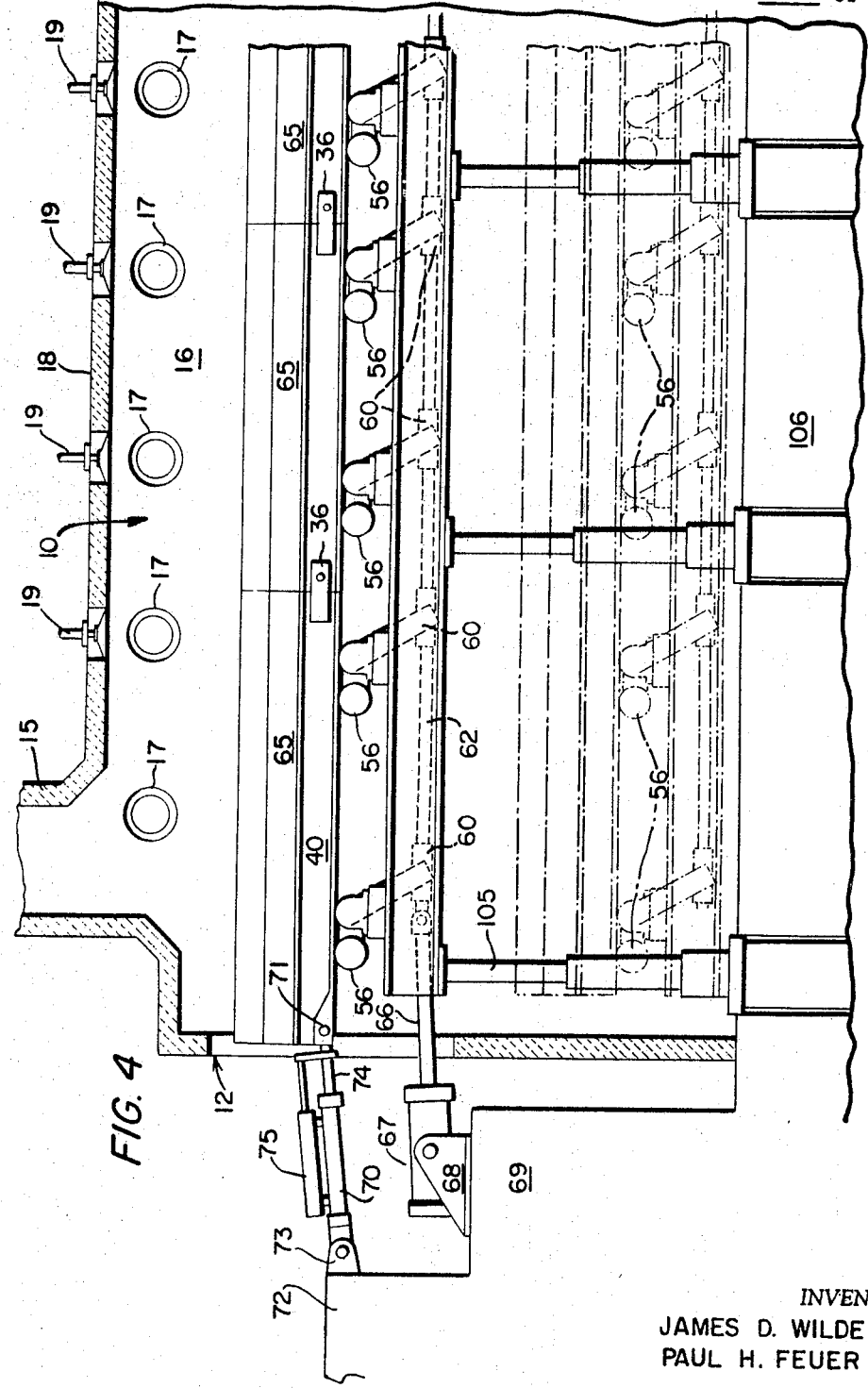

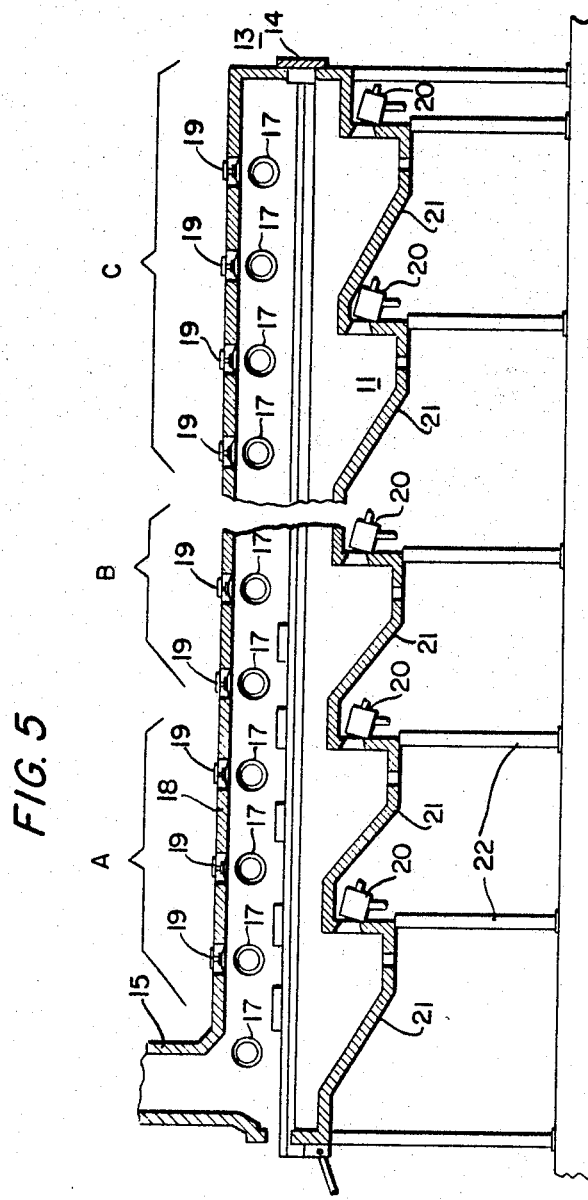

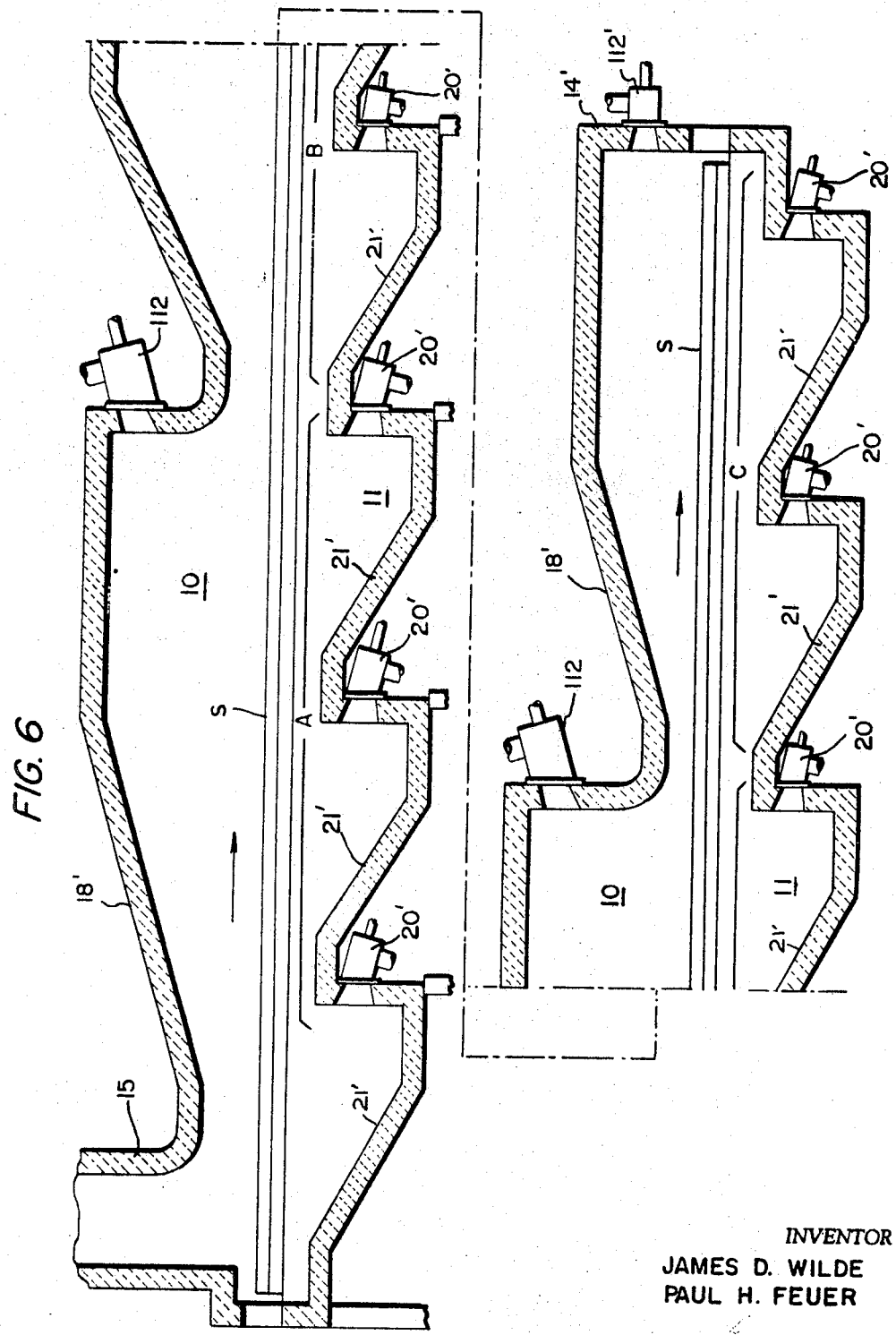

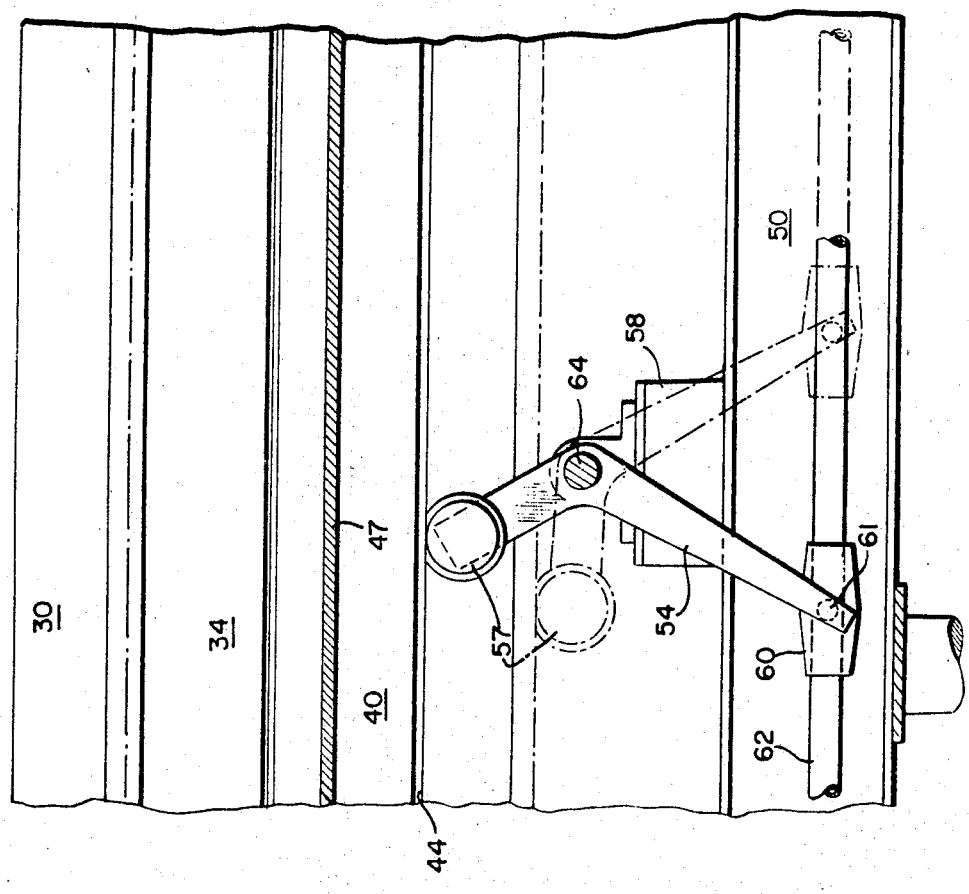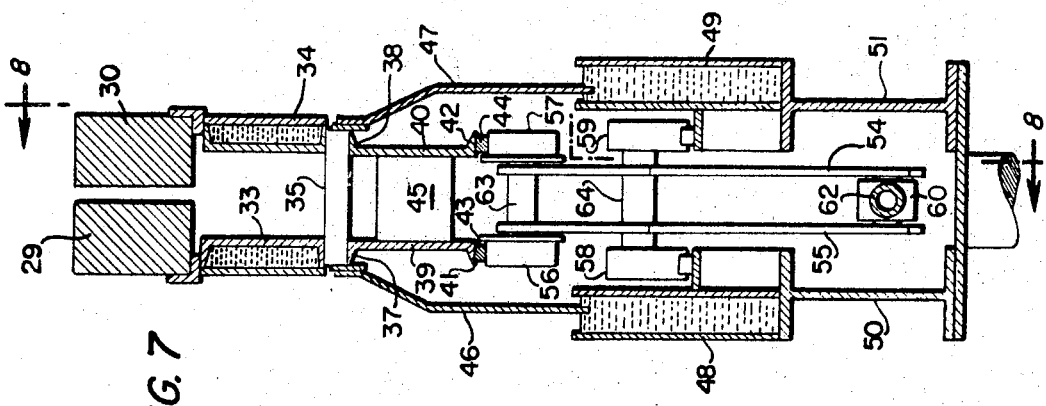

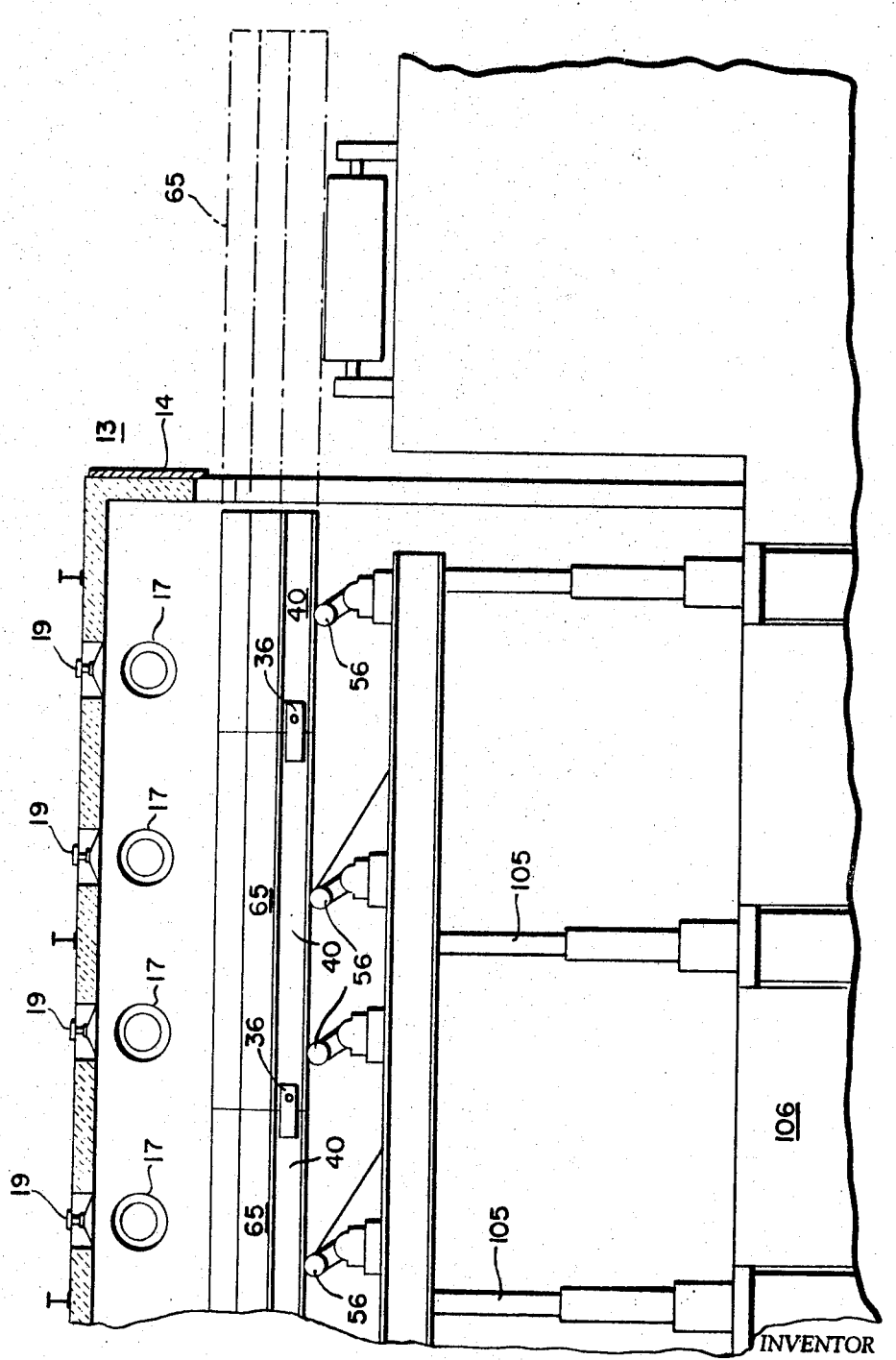

INVENTOR.
JAMES D. WILDE
PAUL H. FEUER
BY

ATTORNEYS

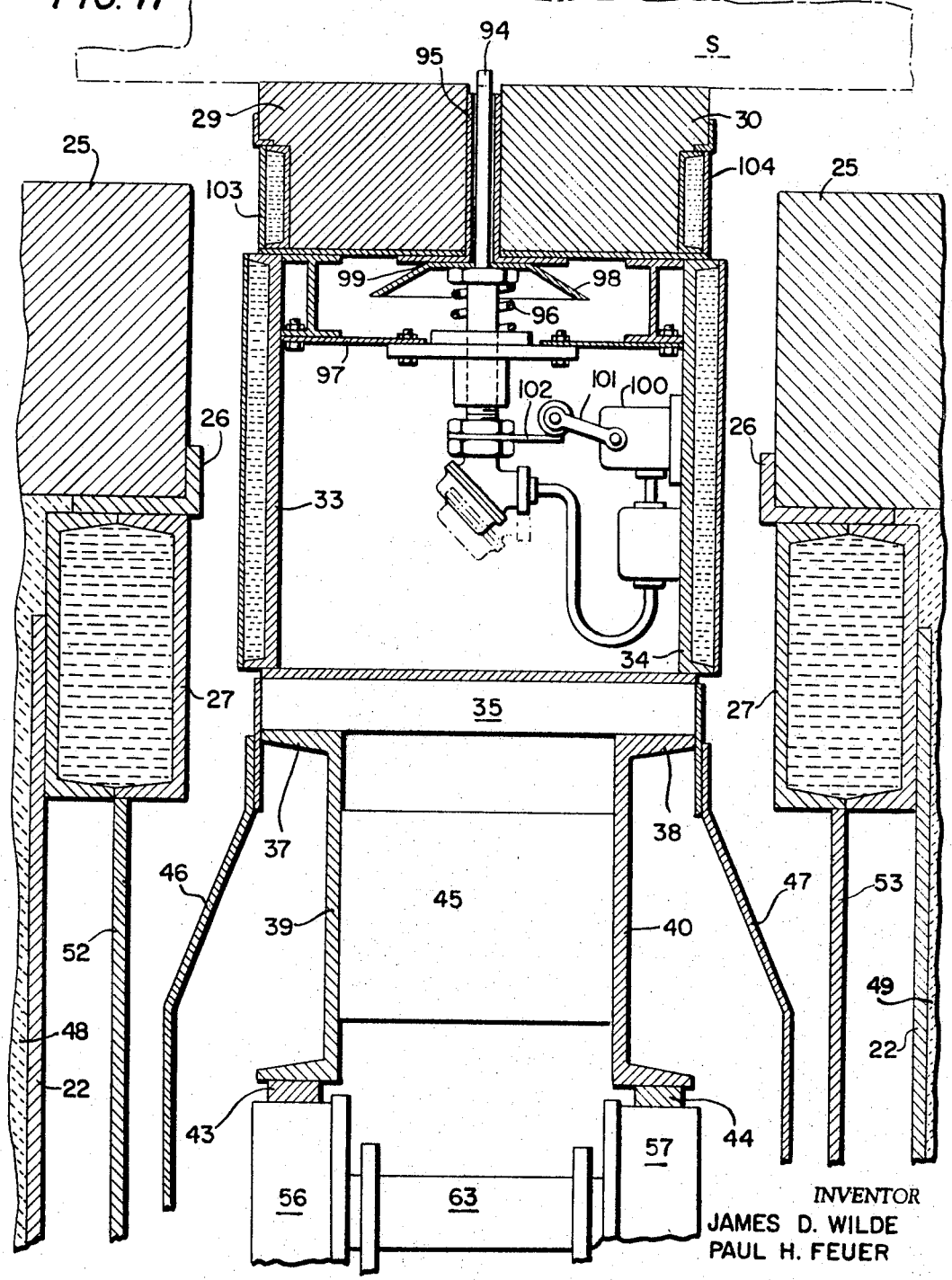

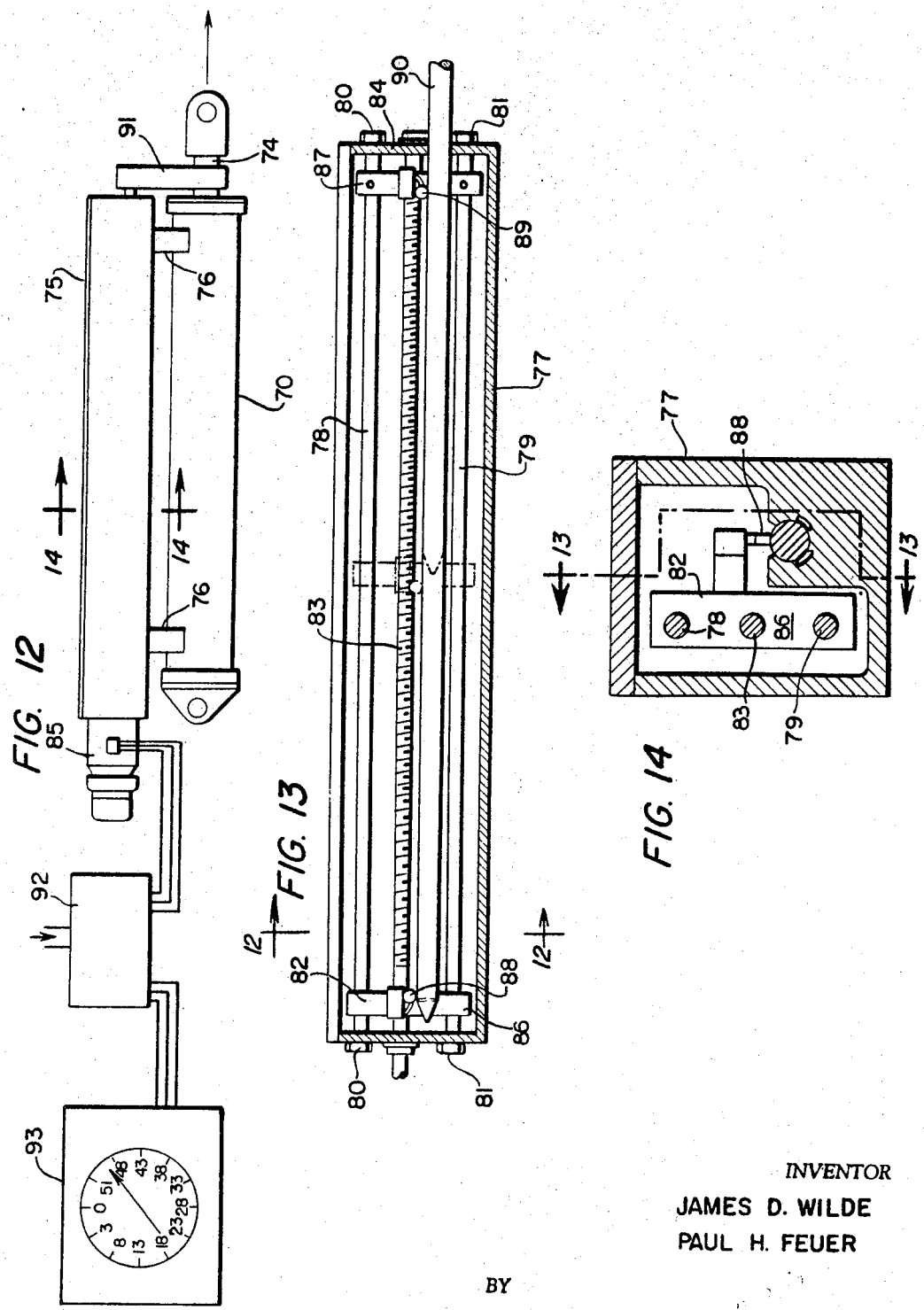

· # United States Patent Office 3,450,394
Patented June 17, 1969

3,450,394
WALKING BEAM FURNACE
James D. Wilde, Etobicoke, Ontario, and Paul H. Feuer, Toronto, Ontario, Canada, assignors to Salem-Brosius (Canada), Limited, a corporation of Canada
Filed Jan. 30, 1967, Ser. No. 612,422
Int. Cl. F27b 9/14
U.S. Cl. 263—6                                    6 Claims

ABSTRACT OF THE DISCLOSURE

The patent specification and drawings disclose a novel method and apparatus for reheating steel or non-ferrous metal stock in a walking beam type furnace preparatory to the rolling thereof and provides a means for heating all sides of the stock including the undersurface thereof so as to obviate the formation of cold spots on the stock at the points of contact of the stock on the supporting surfaces within the furnace area, particularly at the exit end of the furnace enclosure so as to render unnecessary the employment of a solid soaking zone or area which is commonly employed in furnaces of this type.

Background of the invention

Walking beam type furnaces have been employed in the past in the reheating of stock preparatory to the rolling thereof. However, such furnaces have been limited to those having only top and/or side burners and, the undersurface of the stock undergoing reheating was not exposed to any heat generated by burner structures located thereunder with the result that the stock was not evenly reheated, particularly at the undersurface thereof. However, some attempt has been made to position burners on the floor of a walking beam type furnace so as to direct a flame stream to the undersurface of the stock undergoing reheating but in these instances, water-cooled supports have been employed in the furnace to support the stock in its travel from the entrance to the exit end of the furnace enclosure. Therefore, in both furnaces of the known type, cold spots are found on the undersurface of the stock and this occurrence is most undesirable since the cold spots must be removed as by submitting the stock to a soaking hearth zone. It has been found desirable to heat the stock both from the top and the undersurface thereof, particularly where the stock is of a thickness of 6 inches or more so as to enable the same to be more uniformly reheated.

For the purpose of the ensuing description of the structure of the present invention, ingots, blooms, billets and slabs and the like charges of ferrous and non-ferrous material will be referred to as stock.

A walking beam type furnace is one wherein the stock which is undergoing treatment within the confines of a furnace chamber is caused to travel therethrough in what may be termed as a step-by-step movement. Ordinarily there is provided within the interior of a walking beam type furnace a stationary support which supports the stock thereon and upon actuation of the walking mechanism of the furnace, the stock is elevated off the stationary support and while thus elevated is moved forward toward the exit end of the furnace a predetermined distance, thence the forward movement of the elevating mechanism is stopped and the elevating mechanism is lowered to a position where the stock now again rests on the stationary supports of the furnace and remains in that portion of the furnace until such time as the walking mechanism is again actuated to elevate and again advance the stock to a further position within the furnace chamber. This step-by-step movement continues until such time as all of the stock which is undergoing treatment within the furnace chamber has travelled from the entrance end of the furnace to the exit end thereof.

Summary of the invention

It is known that any water-cooled supporting surface which contacts the undersurface of the stock undergoing treatment within the confines of a furnace chamber such as encountered in pusher type furnaces and top and bottom fired walking beam furnaces, operating at temperatures above 2000° F. will occasion what is known as cold spots at the point of contact between the supporting surface and the stock undergoing treatment. The formation of such cold spots are undesirable since the entire area of the stock must attain and retain the desired degree of temperature uniformity across the whole area of the stock prior to being submitted to further operations thereon. Normally this is accomplished by submitting the stock to a soak hearth or soak zone, which is essentially a solid refractory hearth without water-cooled members, over which the stock travels by any means and a uniform temperature is attained throughout the entire area of the stock. The present invention is designed to do away with the solid soak hearth area commonly employed in stock reheating furnaces since water-cooled support members within the confines of the heating chamber are eliminated, thus eliminating the extreme temperature differential across the stock caused by contact with the water-cooled members while still permitting underside heating of the stock.

The present invention therefore, is predicated upon a novel manner of supplying heat to the stock undergoing treatment within a walking beam type furnace and to likewise expose every supporting structure for the stock to the operating temperatures within the confines of the furnace structure so as to obviate any cool-spots on the stock after the same has been processed in the furnace chamber.

Since the walking beam type furnaces are of a type wherein the mechanisms for walking the stock from the entrance to the exit end of the furnace must necessarily be located below the stock so as to permit such mechanism to engage the stock and to move the same in a step-by-step movement, no provision has heretofore been made for heating the underside of the stock and the components of the walking mechanism directly contacting the stock particularly when processing temperatures are above 2000° F. so as to avoid the formation of cold spots on the undersurface of the stock being thus moved. While we have specified an operating temperature of in the neighborhood of 2000° F., it is obvious that the structure to be defined hereinafter is capable of efficient operation at lesser degree heat temperatures.

It is therefore the main object of the present invention to provide a plurality of heat sources within the walking beam type furnace which will direct flames not only toward the upper surface and sides of the stock undergoing a reheating stage in a furnace preparatory to rolling but will also provide for a heat source being directed against the undersurface of the stock and to likewise heat the movable and stationary components of the walking beam mechanism contacting the stock travelling through the furnace.

Another object of the invention is to construct the movable stock bearing supporting surfaces out of a number of sections that are joined together through suitable connecting members so as to facilitate the removal for repair or replacement of any section of the stock supporting surfaces should such removal for repair or replacement be necessary.

Another object of the invention is to provide a plurality of heat sources mounted in the roof and/or sidewalls above the stock and in the area underlying the surface of the stock undergoing treatment within the furnace, to more uniformly heat all portions of the stock to a uniform temperature and to thereby do away with the need of a solid soaking hearth which is commonly employed in reheating furnaces.

It is known that if scratches or gouging are caused to occur on the surface of the stock as it is undergoing treatment within a furnace such as happens in conventional pusher furnaces, that such scratches and/or gouges will frequently continue to occur in the stock even through to the finished piece and this is most undesirable. It is therefore another object of the invention to provide a novel manner of handling stock undergoing treatment within a furnace in such a manner as to obviate the formation of any scratches and/or gouges on the stock.

A still further object of the invention is to provide a structure for a walking beam type furnace whereby stock of varying thickness, width and length can be processed simultaneously therein without danger of the stock piling within the confines of the furnace chamber and to also maintain such stock spaced from one another during its travel through the furnace so as to expose all areas of the stock, including the undersurfaces thereof, to the temperatures created within the furnace.

Another object of the invention is to provide a means associated with the walking mechanism of a walking beam type furnace which will contact the undersurface of the stock undergoing treatment and which will regulate the heat evolved from the burners positioned beneath the stock so as to maintain the temperature of the undersurface of the stock at the same level as the remainder of the stock which derives its heat from either the roof or sidewall burners or from the roof and sidewall burners operating simultaneously, where both the roof and sidewall burners are simultaneously used in one piece of equipment.

A further object of the invention is to provide for a walking beam type furnace whereby the walking beam portion of the furnace can be lowered from an operative position within a furnace structure to a position closely adjacent to the floor area upon which the furnace is mounted or installed so as to enable one to render a repair or service to any portion of the sectionalized stock engaging the supporting means of the present structure. Obviously, when the walking mechanism is in the lowered position such as set forth above, repairs thereto can be readily accomplished with little downtime on the equipment.

A still further object of the invention is to provide a means whereby the sequence of operation of the walking mechanism of the walking beam type furnace may be either manually controlled, or may be caused to operate in sequence regulated by an automatic sequence control such as a programmed tape, card or like automatic programming equipment.

A still further object of the invention is to provide a walking beam type furnace with actuation mechanism therefore which will permit for the stock undergoing treatment therein to be normally moved in a step-by-step movement from the entrance end of the furnace to the exit end thereof but which will permit for the walking mechanism to reverse its line of travel thereby enabling the stock undergoing treatment within the furnace to be removed at the entrance end of the furnace should there be any occasion to remove the same from the entrance end thereof, such as, in the case of extended mill delays caused by any reason and it is undesirable to retain the stock within the furnace chamber for extended periods of time due to excessive scale development.

A still further object of the invention is to provide a structure for the walking beam type furnace wherein through the use of known heat sensing devices strategically mounted within the furnace enclosure there can be maintained a definite control of the heat which is to be applied to the top and sides of the stock undergoing treatment within the furnace regardless of the size of the stock being treated and most of all to provide a structure wherein there are no cold spots formed on the undersurface of the stock as it reaches the exit end of the furnace enclosure. This is in contradistinction to the pusher type furnace commonly employed for the reheating of stock preparatory to rolling where the stock is caused to travel through a furnace area on water-cooled skids or the like which cause a cold-area or spot to occur in the stock at the point of contact with the skid and which cold-area or spot must be removed therefrom by further treatment of the stock on a solid soak hearth. Common practice in a pusher type furnace is to elevate the surface temperature of the underside of the stock not in contact with the water-cooled skid support to levels above that required for rolling, so as to provide a heat reservoir within the stock to subsequently assist in heating the cold area of the stock when the stock is placed on the solid soak hearth. This practice of raising the temperature of the stock above that required for subsequent rolling frequently results in melting and slagging of the stock resulting in build-up of slag in the under-fired zone of the furnace and on the soak hearth, which is most objectionable, and it is set forth that the structure of the present invention will obviate this shortcoming in the reheating of stock as well as many other difficulties normally encountered and as outlined throughout this disclosure.

In view of the above objects, it will be seen that we have devised a furnace structure of the walking beam type which will insure a uniform heating of all the stock undergoing treatment within a furnace enclosure or chamber and which will eliminate completely the subjecting of the stock to a solid soaking hearth area following its passage through the furnace area employing the structure of our invention, while permitting underside heating of the stock for virtually the entire length of the furnace equipment and at the same time eliminating water-cooled support members of any kind from the interior of the furnace chamber.

*Brief description of the drawings*

In accomplishing the above and other objects of the invention, we have provided improved details of structure, preferred forms of which are shown in the accompanying drawings, in which:

FIGURE 1 is a sectional view taken on line 1—1 of FIGURE 3, looking in the direction of the arrows;

FIGURE 2 is a sectional view taken on line 2—2 of FIGURE 1, looking in the direction of the arrows;

FIGURE 4 is a sectional view taken at the entrance end of the furnace and showing in dotted lines the position of the walking beam mechanism when it has been lowered to a servicing position;

FIGURE 5 is a sectional view showing in particular the positioning of the burner assemblies employed with the present invention;

FIGURE 6 is a modification showing the employment of counter flow burners in the upper and lower portions of the furnace chamber;

FIGURE 7 is an enlarged view of one of the walking beam structures employed with the present invention;

FIGURE 8 is a side elevational view taken on line 8—8 of FIGURE 7;

FIGURE 9 is an enlarged section taken at the exit end of the furnace structure of the present invention;

FIGURE 11 is an enlarged section showing one of the walking beam mechanisms having associated therewith a heat sensing element;

FIGURE 12 is a view showing the controls employed for moving the walking beam mechanism of the present invention;

FIGURE 13 is a section taken on line 13—13 of FIGURE 14 looking in the direction of the arrows; and FIGURE 14 is a view taken on line 14—14 of FIGURE 12 looking in the direction of the arrows.

*Description of the preferred embodiments*

Figure 3:
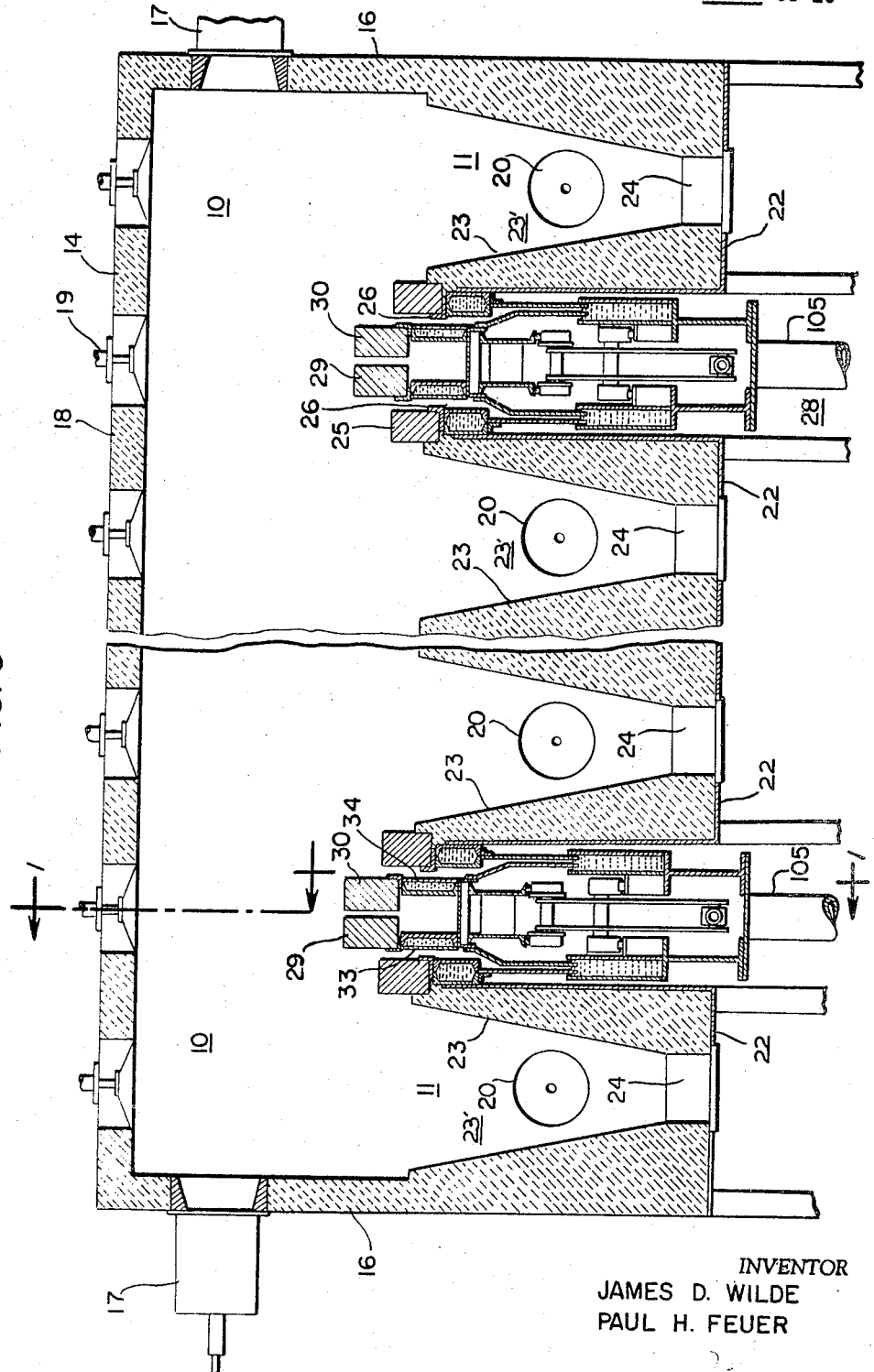
FIGURE 3 is a section taken on line 3—3 of FIGURE 1, looking in the direction of the arrows.

In its preferred form, the furnace of the instant invention comprises an elongated structure formed of a suitable refractory material which is capable of withstanding the heat generated within the furnace. As set forth previously, the furnace of the instant invention is intended for use in the treatment of stock in a degree range of 2000° F. or above although it is submitted that the same may be used in the treatment of stock at lesser degree heat temperatures. The furnace is provided with an upper heating chamber 10 and a lower heating chamber 11. The furnace is provided with an entrance end 12 and an exit end 13. A removable bulkhead 14 is provided at the exit end 13 of the furnace and a stack or flue 15 for the escape of gases from within the furnace is provided adjacent to the entrance end 12 of the furnace.

Suitably mounted in sidewalls 16 of the furnace are a plurality of burners 17 and said burners are positioned in the sidewalls 16 of the furnace at an elevation whereby they will direct a flame stream across the stock which is undergoing treatment within the furnace. Alternately mounted in the roof 18 of the furnace are a plurality of burners 19 and these burners are designed to direct a flame stream, or radiation, downwardly directly toward the stock which is undergoing treatment within the furnace or both firing means may be utilized in any one furnace design simultaneously. Burners 17 and 19 may be either gaseous or liquid fuel fired. Fuel and air are supplied to these burners in any conventional manner.

The upper and lower heating chambers 10 and 11 comprise a plurality of heating zones indicated generally at A, B and C, see FIGURES 1 and 5 of the drawings. While we have illustrated but three (3) separate and distinct heating zones, in each of the top and bottom firing chambers, it is obvious that as many heating zones may be provided in greater or lesser number as is necessary to effect the complete reheating of the stock undergoing treatment within the furnace. The heating zones A, B and C are designed to provide the necessary heat in order to completely heat the stock undergoing treatment and the temperatures in the zones can be varied in a manner to be more fully described hereinafter.

The lower heating chamber designated generally by reference character 11 is provided with a number of burners 20 and are so positioned in the lower wall 21 as to direct a flame stream counterflow in the direction of travel of the stock undergoing treatment within the furnace. The lower burners 20 may be either gaseous or liquid fuel type burners and fuel and air are supplied to these burners in any conventional manner.

The lower heating chambers 11 of the furnace are supported by suitable structural members 22 and consist of a plurality of refractory walls 23 which diverge upwardly as best seen in FIGURE 3 of the drawings and form combustion chambers 23' for the burners 20. Mounted at the upper ends of the refractory walls 23 are stationary refractory stock support piers 25 of sufficient hardness and strength so as to enable the same to properly support the stock, designated at S, which is undergoing reheating within the furnace enclosure. Stationary refractory stock support piers 25 are supported and held in proper position at the upper ends of the walls 23 by means of L- or U-shaped metallic retaining sections 26. Secured in any manner to the undersurface of the structural shaped retaining sections 26 are water-cooled structural supports 27. The water-cooled supports 27 are also secured in any manner to the upper portion of the structural sections 22 as clearly shown in FIGURE 10 of the drawings.

Referring now to FIGURE 3 of the drawings, it will be noted that the sidewall burners 17 are shown as being positioned diametrically opposite one another in their mounting in sidewalls 16. In the construction of certain type furnace installations, it may be found more advantageous from a heat-production standpoint to stagger the mounting of the burners in the sidewalls so that a wider heat distribution may be effected by this arrangement of the burners. Also, the alternate roof burners 19 are shown to be in alignment with one another. Here again, should it be advantageous to stagger the mounting of the roof burners with respect to one another, then this staggering arrangement of the roof burners can be effected at the time of construction of the furnace installation.

Referring again to FIGURE 3 of the drawings, it will be noted that chambers 11 extend between each set of refractory walls 23. While only four (4) combustion chambers are shown in that view of the drawings, it will be understood that there will be a combustion chamber extending between each pair of outwardly diverging refractory walls 23 for a purpose to be more fully described hereinafter. A slag and scale clean-out opening 24 is formed in the lower portion of the chamber 11.

The walking beam structure of the present invention comprises assembly 28 and as many walking beam structures may be provided within a furnace enclosure as to effect the efficient transfer of the stock undergoing treatment therein from the entrance to the exit end of the furnace. It should be pointed out, however, that to obtain most efficient results in the reheating of the stock, combustion chambers such as described above would be provided to extend between each of the upwardly diverging refractory walls 23 between which the assemblies 28 are located.

The walking beam assembly 28 comprises refractory piers 29 and 30 such as shown in FIGURE 3 of the drawings, which are supported and retained in proper position at the upper portion of the walking beam assembly by means of a pair of structural sections 31 and 32 which are in turn suitably secured to and supported by water-cooled housings 33 and 34. While I have shown the refractory piers 29 and 30 being formed of separate members and capable of being spaced apart any desired distance, it is obvious that the piers may be of unitary structure. The water-cooled housings 33 and 34 comprise hollow metallic structures which are adapted to be secured in any known manner to a deck or plate-like member 35 which extends throughout the entire length of the water-cooled housings 33 and 34.

As shown in FIGURES 1 and 4 of the drawings, the refractory piers 29 and 30 are contained within structural steel beam sections with each section held in proper position with respect to the next adjacent section by means of a link mechanism 36. Constructing the upper portion of the walking mechanism in sections has a decided advantage over the walking beam structures known heretofore. In addition to reducing the total deflection of the beam structure due to heat distortion, the beam sections being of short lengths as opposed to being one continuous long unit, has the merit of permitting the easy replacement of any portion or section of the walking mechanism and permits the easy removal of any section for repair and reinstallation thereof following such repair.

Figure 10:
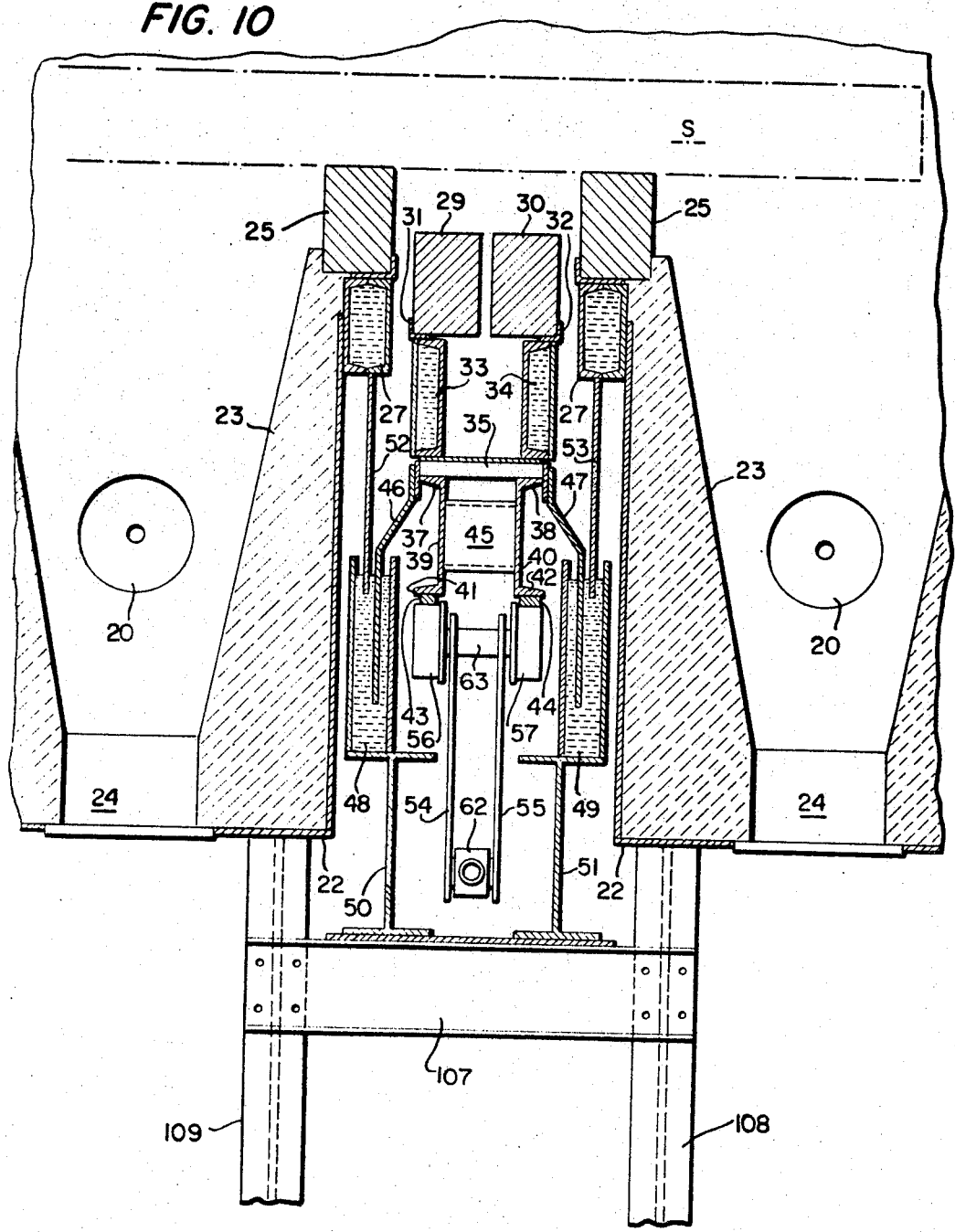
FIGURE 10 is a front elevational view of one of the walking beam structures when in a non-walking position.

The deck or plate-like member 35 is secured in any manner to the upper portions 37 and 38 of oppositely facing structural steel sections 39 and 40 as clearly shown in FIGURE 10 of the drawings. The lower portions of the structural steel sections 39 and 40 present flanges 41 and 42 and wear plates 43 and 44 are suitably secured to the undersurface of the aforementioned flanges. A suitable spacer plate 45 extends between the structural steel sections 39 and 40 and are secured thereto in any suitable manner.

A seal is provided for sealing the interior of the furnace from the outside atmosphere and this can best be seen at FIGURE 10 of the drawings. Secured in any manner to plate 35 are a pair of shield plates 46 and 47 which extend downward into trough-like members 48 and 49 which are supported by a pair of structural steel sections 50 and 51. The troughs 48 and 49 contain water or any other material which can be used to form a seal. The shield plates 46 and 47 are of such dimensions as to always be below the level of the liquid carried in the troughs 48 and 49 so as to always seal the interior of the furnace from the outside atmosphere even when the walking beam is elevated to engage the stock and to advance the same toward the exit end of the furnace. Stationary shield plates 52 and 53 are secured in any manner to the undersurface of water-cooled structural supports 27 and extend downward to a distance below the level of the liquid within the troughs. Since components 27, 31, 32, 33, 34, 46 and 47, 52 and 53 operate at substantially atmospheric temperatures, these members are coated with a suitable protective covering to eliminate attack from sulphur and flue gases which corrode conventional water-cooled components which are exposed to furnace atmospheres containing sulphur at levels under the dewpoint of the waste products.

Positioned beneath the structural steel beams 50 and 51 is the walking beam operating mechanism. This mechanism comprises a pair of spaced crank arms 54 and 55 carrying rollers 56 and 57 which are adapted to engage the wear plates 43 and 44 which are secured to the undersurface of flanges 41 and 42. Crank arms 54 and 55 are mounted for pivotal movement on stationary pillow blocks 58 and 59 and the lower ends of the crank arms and are secured in any manner as through a sleeve and pin connector shown at 60 and 61 to a reciprocating rod 62. The rollers 56 and 57 are mounted for rotation on shaft 63 and the crank arms 54 and 55 are pivotally connected to the pillow blocks 58 and 59 by means of a shaft 64. The pillow blocks 58 and 59 may be supported in any suitable manner by the furnace structural steel supports 22 and associated members not shown.

As can be seen more particularly in FIGURES 1 and 4 of the drawings, each section 65 of the walking beam is supported by a pair of rollers 56 and 57 all of which are adapted to engage the undersurface of wear plates 43 and 44 which are mounted on flanges 41 and 42 and each crank arm for the rollers is secured at its lower end by means of a sleeve and pin connection to the reciprocating rod 62 which extends for substantially the entire length of the furnace. Each walking beam is provided with a reciprocating rod 62 and each is connected to a piston rod 66 of a lift cylinder 67 or like motivating device. A lift cylinder 67 is provided for each reciprocating rod 62.

Lift cylinders 67 may be either hydraulic or pneumatic and derive their propelling force from a suitable source under pressure not shown. Brackets 68 mount the cylinders on a stationary support 69 located adjacent the entrance end of the furnace. Each walking beam assembly 28 is provided with a lift cylinder 67 and the lift cylinders are connected to the reciprocating rods 62 through piston rods 66. All of the lift cylinders derive their propelling force from a common source so that they may all operate in unison or independently when it is desired to elevate the stock from the stationary stock supporting piers 25. Thus, when a source of pressure is applied to the lift cylinders 67 so as to pull all or any number of the reciprocating rods 62 toward the entrance end 12 of the furnace, the crank arms secured to the reciprocating rods 62 will, through rollers 56 and 57, elevate the walking beam sections from the "rest" position shown at FIGURE 10 of the drawings to the "walk" position shown at FIGURE 3. When the walking beam sections are thus elevated, the stock which has been supported by the stationary stock support piers 25 is now elevated thereover and may then be advanced within the furnace area by means of traverse cylinders 70.

A traverse cylinder 70 is provided for each walking beam assembly and the same is connected thereto by means of a detachable connection indicated generally at 71 to the structural support sections 39 and 40 and to a stationary support 72 by means of a bracket 73. Cylinders 70 may be pneumatic or hydraulic and derive their propelling force from a suitable source of pressure, not shown. It should be pointed out, however, that all traverse cylinders 70 derive their propelling force from a common source so that as the pump and motor (not shown) are actuated so as to deliver a fluid under pressure to the cylinders, all or any number of the cylinders operate in unison or independently. Thus, when the walking beam assemblies have been elevated, as aforesaid, and are now supporting the stock thereon, pressure power applied to the traverse cylinders will force the piston rods 74 outwardly through the cylinders and thereby advance the walking beam mechanism and stock to a predetermined distance and thence, the lift cylinders are actuated so as to move the reciprocating rods 62 inwardly of the furnace and through the crank arm assembly as aforesaid, return the walking beam mechanism to the "rest" position and to redeposit the stock onto the stationary supporting piers such as shown more clearly in FIGURE 10 of the drawings.

Mounted in association with one or more of the traverse cylinders 70 is a controller 75 for controlling the forward or inward travel of the piston rod 74 and the walking beam sections to which it is connected. The controller 75 is secured to a traverse cylinder 70 by means of brackets 76 and comprises a housing 77 within which is mounted an electrical switch designed to operate in a manner to be more fully described hereinafter.

A pair of slide bars 78 and 79 extend within the housing and are suitably secured thereto by bolt members 80 and 81. The slide bars 78 and 79 are adapted to guide a movable switch member 82 in its travel within the housing 77. An externally threaded bolt member 83 is mounted for rotation in end wall 84 of the housing 77 and the opposite end of the bolt member 83 is connected to an electric motor shown generally at 85 through a suitable clutching arrangement, not shown.

The movable switch member 82 comprises a generally rectangularly shaped plate or bar 86 with openings therein to receive the slide bars 78 and 79. Also, the bar has an internally threaded opening which is adapted to cooperate with the externally threaded bolt member 83 to move the switch member 82 on slide bars 78 and 79 when the motor 85 is actuated to rotate the threaded bolt 83. Also mounted within the housing 77 is a fixed limit switch 87 mounted on slide bars 78 and 79. Both switches 82 and 87 have associated therewith contact arms 88 and 89 which are adapted to contact with a metallic plunger 90 which is connected through a suitable strap-connection 91 to the piston rod 74 of the traverse cylinder with which it is associated.

As can be appreciated, as the piston rod 74 is forced outwardly of cylinder 70 when pressure is applied to the rear of the piston, the plunger 90 connected thereto through strap 91 will also move therewith.

The motor and pump, not shown, employed for supplying fluid under pressure to the traverse cylinders are in electrical communication with the electrical contacts 88 and 89 of the controller 75 and when the plunger 90 has been caused to travel beyond the contact arm on movable switch 82, as shown in dotted line in FIGURE 13, the electrical circuit is broken and the motor and pump supplying fluid to the traverse cylinders is stopped. Thus, it can be seen that the length of forward travel of the walking beam sections can be regulated by adjusting the movable switch member 82 on the externally threaded bolt 83.

A switch box 92 is provided for the electrical connections and from this switch box, current is fed to the motor 85 which actuates the threaded bolt 83. An indicator 93 is provided for the walking beam apparatus and is in electrical communication with the switch box 92. The indicator 93 is provided with a dial pointer and dial which has printed on the face thereof numbers denoting inches which correspond to the number of inches of forward travel of the walking beam mechanism each time the walking beam assembly is caused to operate to advance the stock in the furnace area. The indicator may be of the type where, upon manual setting of the dial pointer to a given number of inches on the dial indicator, an electrical circuit is closed and the motor 85 through the switch box 92 is caused to move the movable switching member on the externally threaded bolt member to a position corresponding to the number of inches of travel called for by the indicator and when the plunger 90 is pulled outwardly by traverse cylinder 70 to a position beyond the movable contact member, the electrical circuit established by the fixed and movable contacts and plunger is broken with resultant stoppage of feed of current to the motor and pump assembly with forces fluid under pressure to the traverse cylinders, thereby arresting further forward movement of the piston rods and walking beam assemblies associated therewith. If desired, the dial pointer on the indicator 93 may be made responsive to a programmed sequence controller such as a tape, punch card, or the like. The foregoing is one method of providing infinite variability of the walking beam stroke. The walking beam mechanism may be operated in the manner aforesaid or may be operated with fixed stroke against the fixed stop or may be operated with variable stroke against a variable stop position in any conventional manner.

As stated previously, the stock undergoing treatment within the furnace structure is moved throughout the length of the furnace in a step-by-step movement and the distance of forward movement of the stock is determined by the dial setting on the dial indicator which may be either manually preset or responsive to a programmed sequence of operation.

Heretofore, walking beam structures did not provide for burner structures mounted in the lower portion of the furnace so that a flame stream emanating therefrom could be directed longitudinally counterflow to the undersurface of the stock undergoing treatment. However, by reason of the structural modifications as described above, the furnace structure now provides for burners in the lower portion of the furnace so as to insure a proper heating of the undersurface of the stock. To determine the temperature of the stock at the undersurface thereof, there is provided at spaced points along the walking beam mechanism, a heat sensor which will sense the temperature of the stock at the undersurface thereof and through suitable connections, can regulate the amount of fuel and air which is admitted to the burners mounted in the lower portion of the furnace. Preferably, there will be a heat sensor for each zone within the furnace so as to more effectively regulate the temperatures therein. The heat sensing mechanism is shown more clearly in FIGURE 11 of the drawings and comprises a thermocouple in the nature of a high alloy tube 94 which passes through a high alloy sleeve 95 which is mounted in any suitable manner in the refractory piers 29 and 30 and mounted to the support structure 33, 34 and 35. The tube 94 is urged upwardly by spring 96 and in order to minimize the amount of scale formed on the spring and supporting structure indicated generally at 97 in FIGURE 11 of the drawings, a scale shield 98 is mounted on the undersurface of the sleeve 95 as at 99. A limit switch indicated generally at 100 is mounted on the water-cooled housing wall 34 and has an actuating arm 101 extending therefrom and adapted to contact with a plate member 102 which is in any manner suitably secured to the lower end of thermocouple 94. Water-cooled chambers 103 and 104 may be provided at the sides of refractories 29 and 30 if so desired.

The controls for feeding air and fuel to the burners 20 located in the lower heating chambers 11 of the furnace structure are responsive to the heat sensing element previously described and will, through suitable circuitry between the limit switch and the controls for feeding air and fuel to the burner, regulate the amount of heat supplied thereby. Thus, it will be seen that we have provided a novel means of reheating stock whereby the undersurface thereof as it passes through the furnace is exposed to the heat generated by the burners located in the lower portion of the furnace and to thereby insure the proper reheating of this portion of the stock.

As pointed out previously, each sectionalized walking beam mechanism can be lowered within the furnace to a position whereby they may be serviced and provided for this purpose are a plurality of support members 105. Each walking beam mechanism is provided with as many such support members 105 as is deemed feasible to support the walking beam mechanism. Support members 105 comprise telescoping hydraulic or pneumatic or mechanical jack members and are mounted in any suitable manner on base 106. All of the jack members supporting one assembly of sectionalized walking beam mechanism derive their propelling forces from a common source (not shown) so that all of the jack members are adapted to operate in unison either in the elevating or lowering of one assembly of the sectionalized walking beam mechanism. As shown in dotted lines in FIGURE 4 of the drawings, one assembly of sectionalized walking beam mechanism has been lowered onto the base 106 for servicing. Of course, prior to lowering the walking beam mechanism to the position shown in dotted lines in FIGURE 4, the connections between the lift and traverse cylinders and the sectionalized walking beam mechanism are disconnected so as to permit the lowering of the assembly without damaging these parts. As best seen in FIGURE 3 of the drawings, support members 105 are adapted to engage with the bottom surface of structural beams 50 and 51. If desired, removable beams 107 engaging with the undersurface with structural beams 50 and 51 may be provided along the length of the sectionalized walking beam mechanism so as to give added support to the assembly. The beams are secured as by bolt and nut assembly to vertical standards 108 and 109 which are suitably anchored to the base 106. Of course, the removable beams 107 are removed from the standards 108 and 109 when the walking mechanism is to be lowered to a servicing position. In the alternative, the sections of the walking beam mechanism may be removed from the entrance or exit end of the furnace. This can best be seen by the dotted line position of the sections in FIGURE 1. For removal of the sections of the walking mechanism, the link 36 is disengaged and the section removed from the furnace in any known manner.

As stated previously, the burner assemblies for the roof, sidewalls and bottom firing wall may be arranged in alignment with one another along the length of the furnace or may, if desired, be staggered with respect to one another. Also, the burners in the side walls of the furnace may be eliminated and slanted roof burners 112 may be provided such as shown in the modification of FIGURE 6 of the drawings. In the modification shown at FIGURE 6 of the drawings, the modified furnace structure is adapted to have mounted therein the walking beam mechanisms previously described and adapted to function in the same manner. The modified furnace structure shows a plurality of slanted roof and floor structures 18′ and 21′. Suitably mounted in the roof and floor 18′ and 21′ are a plurality of burners 20′ and 112 which may either be gaseous or liquid fuel fired. Air and fuel is supplied thereto in any known manner. It will be noted that all of the aforesaid burner structures are so-positioned in the walls of the furnace as to direct flame streams counterflow to the direction of flow of the stock undergoing treatment within the furnace enclosure, as shown in FIGURE 6 of the drawings. The slanted roof and floor sections 18' and 21' incline toward the line of travel of the stock and in this manner direct the flame streams into close proximity to the stock undergoing treatment. As will be noted, an end wall burner 112' may be provided in end wall 14' and will function in the manner similar to roof burners 112 mounted in the slanted roof structure 18'. It should be pointed out that while only one aligned set of burners 20' and 112 are shown in FIGURE 6 of the drawings, the furnace will be provided with as many aligned sets of burners arranged in spaced relationship to one another across the width of the furnace as to provide for the efficient heating of the stock undergoing treatment and the sectionalized walking beam mechanisms previously described are adapted to be mounted between each set of aligned burner structures. Also, all of the burners for the various sections A, B and C, etc., of the furnace may be set to fire simultaneously or may be fired independently of one another, dependent on the temperatures to be attained within the furnace to properly process the stock undergoing reheating therein. Also, it should be pointed out that the multiplicity of burners could be arranged in any number of zones of firing control, both top and bottom and again top or side fired burners can be utilized both together or singly in conjunction with the under-fired longitudinal counterflow burner arrangement in any manner to achieve specific heating patterns and rates.

Since the stock is walked through the furnace, the walking beam mechanisms are so arranged that the travel thereof can be in either forward or reverse direction. Therefore, in the event of mill delays the stock can be easily removed from the furnace from either the entrance or exit ends thereof. Also, due to the fact that the stock is walked through the furnace as opposed to being pushed therethrough, rapid change in stock thickness, i.e. from 12" to 3" slabs can be easily effected without encountering pile-ups within the equipment.

Since a multiplicity of walking beams can be installed across the width of a furnace, much greater hearth utilization is achieved and the stock undergoing reheating within the furnace is heated from both sides for virtually the entire length of the furnace, thereby increasing the production rates for the furnace assembly. Also, the formation of gouges and scratches on the undersurface of the stock will be completely eliminated since at no time is the stock caused to be slid over a stationary surface which supports the same in its travel through the furnace area. The sectionalized walking beam mechanisms engage with the under surface of the stock in a straight up and down movement during the elevation thereof from the stationary supporting surfaces and following the elevation and forward movement thereof the stock is gently lowered once again onto the stationary supporting piers. Therefore, it will be apparent that the scratching or gouging of the under surface of the stock during its travel through the furnace is completely eliminated.

As previously stated, all of the supporting structures for the stock within the furnace are exposed to the degree of temperatures created within the furnace area and thus attain temperatures which will prevent the formation of so-called cold spots in the stock at the points of contact either with the stationary supporting piers or the support surfaces forming a part of the sectionalized walking beam mechanisms. Thus, with the elimination of the formation of cold spots, as aforesaid, it will not be necessary to submit the stock to a solid soaking hearth, prior to rolling, since the temperature of the entire stock, including that portion coming in contact with the aforementioned supporting surfaces is constant within relatively narrow tolerances throughout the entire stock area. Thus, the walking beam type furnace of our present invention obviates the need of a solid soaking hearth which is commonly employed in furnaces for the reheating of stock.

Having described the various components of the walking beam type furnace of the present invention, we shall now describe the manner of operation thereof.

The stock to undergo reheating in the furnace structure described above is made available at the entrance end of the furnace and each stock piece is in any manner placed on the walking beam mechanism adjacent to the entrance end thereof. From this point the stock will be advanced step-by-step towards the exit end of the furnace and in its movement through the furnace will be exposed to the heat generated in the various zones provided within the enclosure.

As can be appreciated, the stock at the entrance of the furnace enclosure is relatively cool and thus when the same is at rest on the supporting surface at or near the entrance end thereof, the stock undergoing treatment has not as yet been subjected to the operating degree temperatures for a time sufficient to raise the temperature therein to the temperature of the supporting surfaces. However, as the stock advances within the furnace in the manner aforesaid, the undersurface of the stock will ultimately attain the same degree heat temperature as the supporting surfaces thereof, so that as the stock reaches the exit end of the furnace enclosure, the entire undersurface thereof has attained the desired degree temperature with the consequence that the formation of cold spots on the undersurface of the stock, particularly where it engages a supporting surface, has been completely eliminated, thus rendering unnecessary the treatment of the stock on a solid soaking hearth. Thus, it will be seen that we have devised a new method of reheating stock with the employment of a walking beam type furnace.

The heat generated within the upper heating chambers of the aforementioned zones may vary in accordance with the requirements of the stock to be processed and the temperature in the upper heating chambers of the various zones may be regulated in any known manner although preferably through a heat sensing element within the particular zone which will control in any known manner the flow of fuel and air to the burners in the zonal areas. Thus, for example, if the temperature in zone A is to be maintained between 2000° and 2200° F. then the roof and/or side wall burners at zone A are supplied with sufficient fuel and air to maintain the temperature between these degree temperatures. Then as the stock is moved to the next zone the temperatures therein may likewise be maintained at the desired degree temperature as aforesaid and so on until the stock has travelled to the last zone within the furnace where it will be again subjected to a temperature by the burners therein to a temperature which will render unnecessary the employment of a solid soaking hearth. The burners mounted in the lower heating chambers are made responsive to the heat sensing element previously described, or may be controlled in any conventional manner, and the amount of flow of fuel and air to these burners will maintain a constant temperature at the undersurface of the stock and likewise to all of the supporting surfaces for the stock thus eliminating the formation of cold spots. Of course, the lower heating chambers or zonal areas can correspond in number to the number of zonal areas formed by the upper heating chambers, although this arrangement of upper and lower heating chambers may vary depending upon the requirements of the stock undergoing treatment.

As can be seen more clearly at FIGURE 2 of the drawings, stock of varying lengths can be loaded into the furnace and can be properly processed therein. Preferably, however, the stock to be processed within the furnace is of such a length as to extend over a pair of aligned sectionalized walker mechanisms although the furnace can properly handle stock of shorter lengths if desired. Stock of shorter lengths than aforesaid may be centered upon one of the sectionalized walking beam mechanisms and caused to be supported by only one pair of stationary refractory piers when in a non-walking position. Thus, it will be seen that the walking beam type furnace of the present invention is not limited to the processing of stock of any given length and size since the limits of the size stock is dependent solely upon the width of the furnace. Also, since the stock undergoing processing is advanced through the furnace in a step-by-step movement the stock will be spaced from one another thereby exposing the sides of the stock to the furnace temperature to thus more uniformly heat all of the stock.

The cycle of operation of the sectionalized walking beam mechanisms can be normally controlled or, if desired, the same can be set to operate responsive to a programmed control such as a punched card, tape, or any other like device operating in conjunction with the electrical circuitry associated with the switch box controlling the operation of the various electrical components employed for activating the hydraulic, pneumatic or electromechanical means for the actuating cylinders employed with the present structure.

Since walking beam furnaces capable of being fired both above and below the stock and further capable of operating at temperatures above 2000° F. have not been available to industry, the type of furnace equipment accepted as standard within the said industry particularly for the reheating of slabs or similar rectangular shaped stock has been the pusher type furnace.

The present invention is based on the finding that within presently imposed design limitations it is possible to achieve improved performance by providing a furnace structure wherein considerably greater controlled heating can be accomplished, infinite variations in stock thickness can be handled, maintenance is substantially reduced, scratching of the stock is eliminated, slagging of the stock can be controlled and eliminated and piling and associated problems are not a consideration. The objects and advantages of the invention are realized by providing a multiplicity of controlled zones in the furnace in which heat is applied to the underside of the stock by counterflow firing zones, while the top of the stock is heated by means of cross-fired and/or roof radiation burner equipment combined with a walking beam structure.

While in accordance with the provisions of the statutes we have illustrated and described the best form of embodiment of our invention now known to us, it will be apparent to those skilled in the art that changes may be made in the form of the apparatus disclosed without departing from the spirit of the invention as set forth in the appended claims and that in some cases certain features of our invention may be used to advantage without corresponding use of other features.

Having now described our invention, what we claim as new and desire to secure by Letters Patent is:

1. In a heat treatment furnace for metal stock comprising an enclosure having a plurality of heating zones therein, means within said enclosure for advancing metal stock therein from the entrance of said enclosure to the exit end thereof, said means comprising a plurality of stationary support members extending throughout the area defined between the entrance and exit end of said enclosure, a plurality of stock elevating and advancing members coextensive with said stationary support members, a plurality of burner structures mounted in the upper portion of said enclosure forming an upper heating chamber, a plurality of burner structures intermediate said stationary support members for forming a lower heating chamber, said burners in said lower heating chamber adapted to direct a flame stream against the undersurface of the stock and counterflow the line of travel thereof through the furnace area, said burner structures adapted to ultimately heat said supporting structures to a degree temperature substantially the same as the degree temperature attained by the stock undergoing treatment in said enclosure, so as to obviate the formation of cold spots therein at the exit end of said furnace.

2. The structure defined in claim 1 wherein heat sensing elements are mounted in said zonal areas to regulate the supply of fuel and air to the said burner structures for maintaining a desired degree temperature in said zonal areas.

3. The structure defined in claim 2 wherein additional heat sensing elements are mounted on said stock elevating and advancing members and are adapted to contact with the undersurface of said stock and to thereby regulate the supply of fuel and air to the burners in the lower heating chambers in the respective zonal areas.

4. The structure defined in claim 2 wherein additional heat sensing elements are mounted on said stock elevating and advancing members and are adapted to contact with the undersurface of said stock and to thereby monitor the temperature of the undersurface of the stock.

5. In a heat treatment furnace for metal stock comprising an enclosure having a plurality of heating zones extending longitudinally within said enclosure, a plurality of burners mounted in the roof and side walls of said enclosure defining an upper heating chamber, a plurality of burners mounted in the base portion of said enclosure defining a lower heating chamber, stock elevating and advancing mechanism for said stock from the entrance to the exit end of said enclosure, said roof and side wall burners positioned above the line of travel of said stock from the said entrance to said exit end of said enclosure, said burners mounted in the base of said enclosure adapted to direct a flame stream against the undersurface of said stock and counterflow the line of direction of travel of said stock from the entrance to the exit end of said enclosure, stationary stock supporting members extending throughout the entire area of said enclosure from the entrance to the exit end thereof, said stationary stock supporting members defining a combustion chamber area for the burners mounted in the base of said enclosure, said stock elevating and advancing mechanism mounted for movement between said stationary stock supporting members for elevating said stock from said stationary stock supporting members and while thus elevated advancing said stock a predetermined distance within said enclosure, said burner structures within said enclosure simultaneously heating said stock and said stationary and elevating and advancing mechanism from the entrance to the exit end of said enclosure, the heat absorbed by said stock on said supporting surfaces from the entrance end of the exit end of said enclosure increasing in degree temperature such that as the stock reaches the exit end of the said enclosure, said stock and said supporting surfaces therefore attaining substantially the same degree heat temperature so as to eliminate cold spots on said stock as it reaches the exit end of said enclosure.

6. A fuel fired furnace chamber having walking beam type means for moving stock from the entrance end of the furnace to the exit end thereof, stationary and moveable refractory supporting surfaces mounted within said chamber and extending from the entrance to the exit end thereof, upper and lower heating chambers in said furnace chamber and having burners mounted therein, said refractory supporting surfaces defining combustion chambers which extend from the entrance end of the furnace to the exit end thereof, said refractory supporting surfaces adapted to ultimately obtain substantially the same degree temperature as is attained by the stock supported thereon so as to obviate the formation of cold spots therein at the exit end of said furnace, said burner structures which are mounted in the lower heating chambers positioned to direct a flame stream counterflow to the line of travel of the stock supported thereon.

(References on following page)

References Cited

UNITED STATES PATENTS 1,916,363 7/1933 Dressler.
2,057,367 10/1936 Cone.

FOREIGN PATENTS 813,362 5/1959 Great Britain.

FREDERICK L. MATTESON, Jr., *Primary Examiner.*

E. G. FAVORS, *Assistant Examiner.*